United States Patent [19]
Brishka

[11] 3,782,840
[45] Jan. 1, 1974

[54] MECHANICAL COUPLING
[75] Inventor: Alexander R. Brishka, Mamaroneck, N.Y.
[73] Assignee: Sealectro Corporation, Marmaroneck, N.Y.
[22] Filed: Oct. 5, 1971
[21] Appl. No.: 186,667

[52] U.S. Cl..............................403/361, 285/316
[51] Int. Cl................................................F16b 7/00
[58] Field of Search...................... 285/316, 322; 339/91 R, 91 P, 74 R; 287/119 R; 24/211 R, 211 L

[56] References Cited
UNITED STATES PATENTS
| | | | |
|---|---|---|---|
| 3,206,540 | 9/1965 | Cohen | 339/91 P X |
| 3,368,182 | 2/1968 | Culver | 285/316 X |
| 2,983,893 | 5/1961 | Jackson | 339/91 R |

OTHER PUBLICATIONS
German printed application 1,197,959, 8/1965, VEB Rafena Werke, 25 ut. dwg., 2 pp. spec.

Primary Examiner—Andrew V. Kundrat
Attorney—James M. Heilman

[57] ABSTRACT

A mechanical coupling which locks into place without relative rotation of the male and female components. The device may include hydraulic conduits, electrical multi-connectors or a high frequency coaxial line. An annular groove in the male component or plug is engaged by an annular bead formed on the inside surface of a set of fingers secured to the female component or socket. The fingers are locked in place by locking ring formed integral with an outer sleeve. The outer sleeve is moved in an axial direction when the components are attached or separated.

8 Claims, 6 Drawing Figures

PATENTED JAN 1 1974 3,782,840
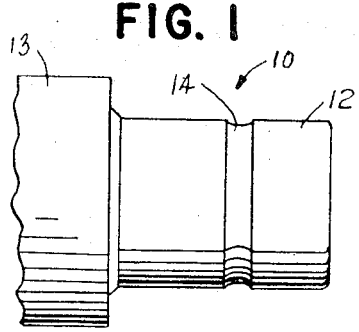
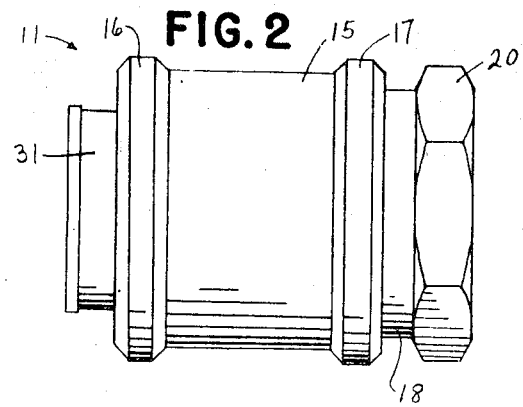
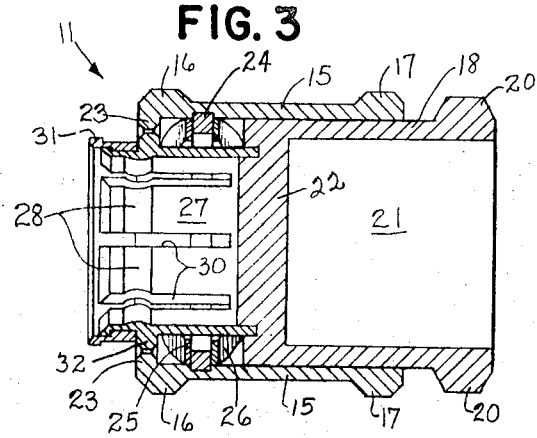
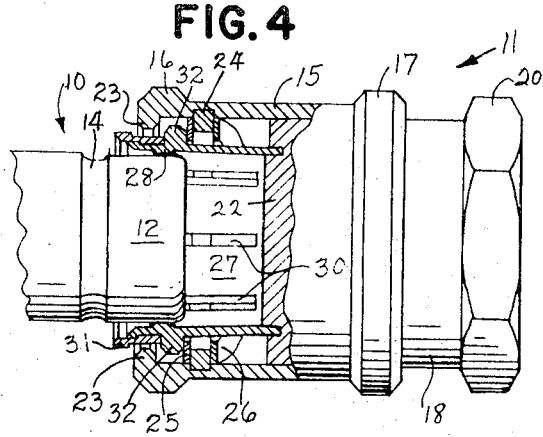
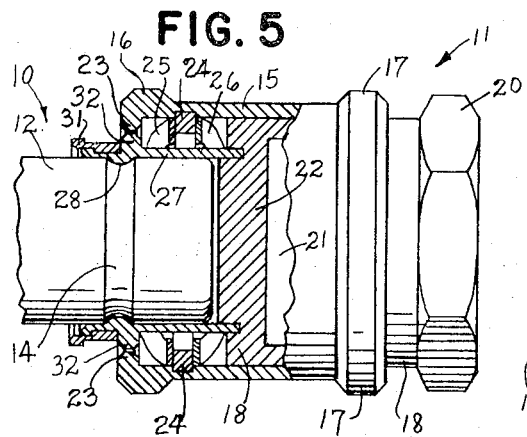
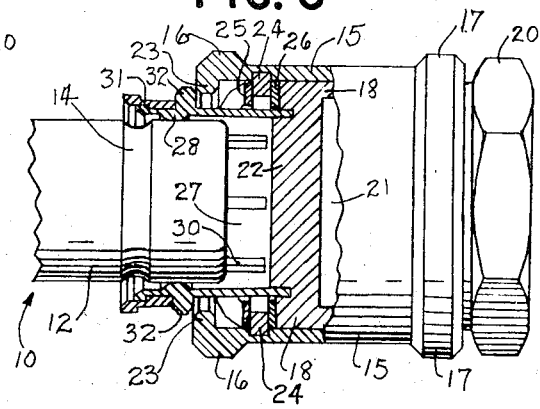
ALEXANDER R. BRISHKA
INVENTOR
BY James M. Heilman
ATTORNEY

MECHANICAL COUPLING

BACKGROUND OF THE INVENTION

There are many coupling devices for similar purposes in the prior art, but such devices are subject to serious manufacturing and operational difficulties. In some systems, prior coupling devices are primarily unsatisfactory by reason of their excessive weight and size. In addition, prior coupling devices are extremely complex in construction and require numerous intricate parts, many of which are exposed, which renders the devices subject to malfunction and they are difficult to operate.

Many prior art couplings require the rotation of a locking device, sometimes a threaded nut or a series of spaced lugs which require rotational movement. The present invention requires no rotational movement and for that reason, the device may be operated with one hand and without the application of tools.

One of the features of the present invention is a locking device which may be coupled or uncoupled by axial movement of the parts.

Another feature of the invention is the ability to couple the plug and socket components regardless of their relative axial position, there being no pin-in-slot nor bayonet type of securing means.

Other features and additional details of the invention will be disclosed in the following description, taken in connection with the accompanying drawings.

BRIEF DESCRIPTION OF THE FIGURES

FIG. 1 is a side view of the plug portion of the coupling.

FIG. 2 is a side view of the socket portion of the coupling.

FIG. 3 is a cross sectional view of the socket portion of the coupling.

FIG. 4 is a side view, with some parts in section, of the coupling, showing the position of the parts as the two components are in the process of being joined.

FIG. 5 is a view similar to FIG. 4 with the plug and socket fully coupled together.

FIG. 6 is a view similar to FIG. 5 but with the components in the process of being uncoupled.

DESCRIPTION OF THE PREFERRED EMBODIMENT

Referring now to the figures, the coupling comprises a plug component 10, shown in FIG. 1, and a socket component 11, shown in FIG. 2. The plug comprises a cylinder 12 which may be made of metal or plastic. The cylinder 12 is secured to a base portion 13 (FIG. 1) which may be of any convenient conduit form, this portion of coupling being not a part of the invention. The base portion may be a pipe for conveying liquids or gas, or it may be a cable for holding one or more electrical conductors. The cylinder 12 may contain electrical connectors or valves. An annular groove 14 is formed in the outside surface of the plug to aid in the locking function.

The socket, shown in FIG. 2, includes an outer sleeve 15 having reinforcing ribs 16 and 17 at its ends. The sleeve 15 is slidable on the cylindrical main body 18 of the socket 11. The main body 18 includes a hexagonal end portion 20 for gripping with a wrench when attaching to a cable or pipe. The interior space 21, as noted above may be filled with many types of communicating equipment and the end wall 22 of this body may be formed with one or more holes for the passage of communicating equipment. Rib 16 includes an inwardly extending rim 23 which functions as a locking means. The operation of this locking rib will be described later.

The inner surface of sleeve 15 is formed with an annular groove near the rib 16 and a retaining ring 24 (containing a short cut out portion) is snapped into this groove. Retaining ring 24 acts as a limit means to retain two corrugated springs 25 and 26 within predetermined spaces. Each spring 25, 26 is formed with alternate ridges and grooves so that each exerts an axial force against its retaining structures. In order to assemble the springs 25 and 26, and to permit them to expand and contract, it is convenient to form each of them with a cut out section.

The locking member 27 comprises a hollow cylinder secured to the cylindrical body 18 by any convenient means. The cylinder includes an annular bead 28 extending inwardly and forming the other locking member which cooperates with groove 14 to lock the two components together. A plurality of slots 30 are cut in cylinder 27 (forming tines) to make the ends carrying the bead 28 more resilient and capable of expanding the bead periphery when the two coupling components are combined or separated. At the outer ends of the tines 28, a resilient spring ring 31 is positioned, adding additional elastic force to keep the tine ends in their current position. The spring ring 31 may have a short cut out section to aid in the expansion and contraction characteristics. The locking member 27 is also formed with an annular ridge 32 which fits under the inwardly extending rim 23 when in the locking position.

The operation of this coupling is as follows:

When the socket 11 is in its separated form, its parts are in the positions shown in FIG. 3. When the plug 10 is to be joined to the socket 11, the sleeve 15 is manually pushed toward the plug 10 moving rim 23 away from its normal position opposite rim 32 and compressing annular spring 25. This action permits the tine extensions of the locking member 27 to move outwardly so that bead portions 28 ride over the plug surface as shown in FIG. 4. During this action rim 32 expands adjacent to internal rim 23 and the ring spring 31 also expands. When the bead portions reach groove 14 they drop into the groove, urged by spring ring 31, and the sleeve 15 is then released, permitting rim 23 to resume its normal position opposite rim 32. As long as rims 23 and 32 are opposed to each other, as shown in FIG. 5, the two components are locked together. Washer springs 25 and 26 are resiliently stressed against retaining ring 24 and tend to maintain the sleeve 15 in its locked position. While in the locked position, a pull or push on the main body 18 or the end portion 20 will not disengage the coupling.

When the coupling components are to be separated, an operator pulls sleeve 15 away from the plug component, compressing washer spring 26, as shown in FIG. 6. This action removes rim 23 from its position opposite rim 32 and permits the head portions 28 to be pulled free of groove 14 and ride on the surface of plug 12. The socket may now be pulled away from the plug.

From the foregoing description, it will be evident that the socket 11 can be joined to the plug 10 by grasping the sleeve 15 and moving it axially toward the plug base 13. To remove the socket from the plug, the sleeve is moved toward the nut 20 and the separation will follow.

The embodiments of the invention in which an exclusive property or privilege is claimed are defined as follows:

1. A mechanical coupling including a plug and a socket combination arranged for manual operation comprising: a plug of general cylindrical shape including an annular groove formed in its outer surface; a socket including a main cylindrical body and a plurality of resilient tines secured to said body in a circular arrangement for surrounding said plug, each of said tines formed with an inwardly extending bead for engagement by the groove, and an outwardly extending rim for aiding in the locking operation; and a sleeve slidably mounted on the outer surface of said socket, said sleeve including an interior retaining ring and an inwardly extending rim for cooperating with the outwardly extending rims on the tines to maintain the tine beads in said plug groove when in a normal locked position, spring means mounted on either side of the retaining ring for resiliently positioning the sleeve in its normal position, and wherein said interior retaining ring is a separable component and is fitted into an annular slot formed in the interior surface of the sleeve.

2. A coupling as claimed in claim 1 wherein said outwardly extending rims are each adjacent to the inwardly extending beads.

3. A coupling as claimed in claim 1 wherein said inwardly extending rim on the sleeve is formed integral with the sleeve and is positioned at the tine end of the sleeve.

4. A coupling as claimed in claim 1 wherein said spring means on either side of the retaining ring are washer type springs formed with corrugations around their peripheries.

5. A coupling as claimed in claim 4 wherein said washer type springs are mounted between the sides of the retaining ring and the outwardly extending rims formed on the tines and an annular ridge on the main socket body respectively.

6. A coupling as claimed in claim 1 wherein said sleeve is formed with an outwardly extending rim adjacent to a rim on the main socket body for convenient manual engagement by an operator.

7. A coupling as claimed in claim 1 wherein said tines are engaged by a ring spring at their extremities for resiliently urging the springs to make contact with the plug surface when the components are being joined.

8. A coupling as claimed in claim 7 wherein said tines are formed with a shoulder adjacent their free ends for retaining the ring in its operating position.

* * * * *